United States Patent [19]

Sahm et al.

[11] 3,864,333

[45] Feb. 4, 1975

[54] PROCESS FOR THE PREPARATION OF FURANE COMPOUNDS

[75] Inventors: Wilfried Sahm; Anton Horn, both of Kelkheim/Taunus, Germany

[73] Assignee: Hoechst Aktiengesellschaft, Frankfurt/Main, Germany

[22] Filed: Aug. 10, 1972

[21] Appl. No.: 279,645

[30] Foreign Application Priority Data
Aug. 13, 1971 Switzerland..................... 11926/71

[52] U.S. Cl......... 260/240 D, 8/1 W, 252/301.3 W, 260/247.7 E, 260/247.7 G, 260/283 R, 260/290 HL, 260/293.58, 260/307 D, 260/307 G, 260/332.2 C, 260/332.5, 260/346.1 R, 260/346.2 R, 260/346.2 M, 260/347.5, 260/465 F, 260/465 G, 260/469, 260/476 R, 260/473 F, 260/556 AR, 260/591, 260/592, 260/600, 260/612 D, 260/621 N, 260/650 F, 260/651 F

[51] Int. Cl............................................. C07d 5/40

[58] Field of Search... 260/240 D, 346.2 R, 346.2 M, 260/307 D, 293.58, 247.7 G, 247.7 E

[56] References Cited
OTHER PUBLICATIONS

J. Ind. Chem. Soc. 40:31–34 (1963) Singh et al.
J. Ind. Chem. Soc. 39:49–52 (1962) Singh et al.
Chem. Ber. 36:3979–3986 (1903) Stoermer.
Advances in Organic Chemistry, Vol. 5, (1965) Parker. "The Use of Dipolar Aprotic Solvents in Organic Chemistry."

Primary Examiner—Henry R. Jiles
Assistant Examiner—S. D. Winters
Attorney, Agent, or Firm—Connolly and Hutz

[57] ABSTRACT

Benzofuranes are obtained by intramolecular condensation of aromatic oxo compounds having an oxymethylene group in ortho position. The condensation is effected with strongly alkaline agents in solution or in an alkali metal hydroxide melt. The products are useful as scintilators and optical brighteners.

5 Claims, No Drawings

PROCESS FOR THE PREPARATION OF FURANE COMPOUNDS

The present invention relates to a process for the preparation of furane compounds.

It is known to prepare 2-(p-nitrophenyl)-benzofurane by intramolecular condensation of o-(4-nitrobenzyloxy)-benzaldehyde in methanol in the presence of potassium carbonate (cf. K.B.L. Mathur and H.S. Mehra, J. Chem. Soc., London 1960, 1954–1955). This reaction, however, cannot be applied generally. It cannot be carried out, for example, with o-benzyloxy-benzaldehydes which have no nitro group at the benzyl radical and are, therefore, not able to form reactive nitronic acid salts.

It was, now found that compounds of the formula (1)

(1) 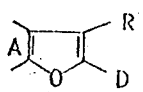

wherein A is an aromatic mono or polynuclear ring system which is condensated with the furane nucleus with two adjacent carbon atoms as indicated, R is a hydrogen atom, an optionally substituted low molecular alkyl group or an optionally substituted phenyl group and D is an organic radical being conjugated with the furane radical, can be prepared by separating water with strongly basic condensating agents from a compound of the formula (2)

(2) 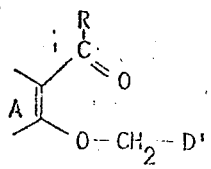

wherein A and R are defined as above and D' is an organic radical which is conjugated with the double bonds of the furane nucleus after ring closure.

In the process of the invention, there are preferably prepared compounds of the formula (1')

(1') 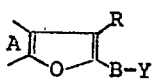

by intramolecular condensation of compounds of the general formula (2')

(2') 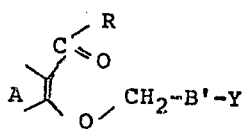

in strongly polar organic solvents under the action of strongly alkaline condensation agents. When using compounds which are especially stable to heat and alkali a suitable alkaline melt may also be used.

In general formulae (1') and (2') A and R are defined as above. The other symbols are defined as follows:

B. is a continuously conjugated chain of carbon atoms which is, wholly or in part, a constituent of a carbocyclic or heterocyclic ring system in which one or more than one carbon atoms may be replaced by hetero atoms, such as oxygen and sulfur, especially nitrogen, and the double bonds are placed in such a manner that the molecule is completely conjugated, B'. is a continuously conjugated chain of carbon atoms which is, wholly or in part, a constituent of a carbocyclic or heterocyclic ring system in which one or more than one carbon atoms may be replaced by hetero atoms, especially nitrogen, and the double bonds are placed in such a manner that a molecule is formed after ring closure which is completely conjugated, Y. is a hydrogen atom or an aryl optionally modified carboxy or sulfo group, an acyl, sulfonyl or nitro group which are linked to the carbocyclic or heterocyclic ring systems of B or B'.

The substituents Y may be bound to B and B' by a single or several bonds independently from one another. Alkyl or alkoxy groups may also be linked to B' and, accordingly, to B, but only if B' possesses electron-accepting groups the electron-accepting influence of which on the $CH_2$-group over-compensates the effect of the said groups as electron-donors.

Suitable substituents which may be linked to the radicals A and R are, for example, alkyl, alkenyl, alkynyl, alkylene, aryl, aralkyl, aralkenyl, aralkynyl, alkoxy- or carboxy or sulfo groups optionally having modified functions, acyl and sulfonyl groups optionally having modified functions and halogen atoms. Among these substituents there are preferably used those which contain aliphatic radicals having from 1 to 4 carbon atoms or the aryl radical of which is a phenyl radical; carboxy or sulfo groups having modified functions are especially amides, monoalkyl and dialkyl amides having from 1 to 4 carbon atoms in the alkyl groups and ester groups of alcohols having from 1 to 4 carbon atoms. The preferred halogens are bromine and chlorine. These substituents are not allowed to contain hydrogen atoms which can be substituted by metal atoms in a more easy or similarly easy manner as compared with the hydrogen atoms of the $CH_2$—group in formulae (2), (2') or (4).

Functionally modified carboxy groups are, at first, their salts with colourless cations, alkali metal ions or ammonium ions being preferred. There may, furthermore, be mentioned, the cyano group (nitrile group), the carboxylate group or the carboxylic acid amide group. Carboxylate groups are especially those of the general formula $COOR^1$ wherein $R^1$ is a phenyl radical or a lower alkyl group optionally having a branched chain, which radicals may contain further substituents, such as a preferably low-molecular dialkylamine, lower trialkylammonium or alkoxy group in which dialkylamino or trialkylammonium groups two alkyl groups may be replaced by a ring, such as in morpholino or piperidino groups. A carboxylic acid amide group is especially one of the formula $CONR^2R^3$ wherein the radicals $R^2$ and $R^3$ are hydrogen atoms or lower alkyl groups optionally substituted, which may also form together with the nitrogen atom a hydroaromatic ring, such as a piperidino or morpholino group.

Functionally modified sulfo groups are, according to the description given above, the salts with colourless cations, preferably alkali metal ions or ammonium ions, and derivatives in which the $SO_2$-group is linked to a hetero atom, as to be found in the sulfonate group and in the sulfon amide group. A sulfonate group is especially one of the formula $SO_2OR^1$ wherein $R^1$ is defined as above and a sulfon amide group is one of the formula $SO_2NR^2R^3$ wherein $R^2$ and $R^3$ are defined as above.

An acyl group is especially one of the formula $COR^4$ wherein $R^4$ is a preferably lower alkyl or a phenyl radical which may optionally be substituted.

A sulfonyl radical is especially one of the formula $SO_2R^5$ wherein $R^5$ is a lower alkyl or a phenyl radical, optionally substituted each which may carry as substituents preferably a lower dialkylamino, lower trialkyl ammonium, acylamino (each as defined above) or sulfo group.

A special variant of carrying out the process of the invention is to prepare compounds of the general formula (3)

(3) 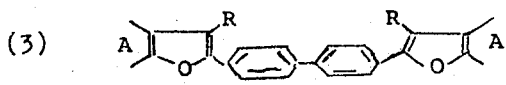

by splitting off water from compounds of the general formula (4).

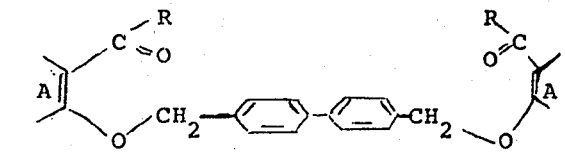

(4)

The radicals R and A of these formulae have the same definitions as given above.

The compounds of the general formulae (2), (2') and (4) are prepared by reacting in organic solvents, compounds of the general formula (5)

(5) 

in which M is an alkali metal or an alkaline earth metal cation and A and R are as defined in the general formula (1), with compounds of the general formula (6), (6') and (7)

X—CH$_2$—D' (6)    X—CH$_2$—B'—Y    (6')

(7) 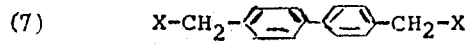

in each of which
X is the anion of an inorganic acid, preferably of a hydrohalic acid and
D', B' and Y are as defined in the general formulae (2) and (2').

The alkali metal or alkaline earth metal salts may, for example, be the following:
Salicylic aldehyde, 5-chloro-salicylic aldehyde, 3,5-dichloro-salicylic aldehyde, 3-bromosalicylic aldehyde, 4-bromo-salicylic aldehyde, 5-bromosalicylic aldehyde, 3,5-dibromosalicylic aldehyde, 3-fluoro-salicylic aldehyde, 3-chloro-salicylic aldehyde, 6-methyl-salicylic aldehyde, 5-chloro-6-methylsalicylic aldehyde, 3-methyl-salicylic aldehyde, 5-methylsalicylic aldehyde, 4-methyl-salicylic aldehyde, 5-chloro-4-methyl-salicylic aldehyde, 6-ethyl-salicylic aldehyde, 3-ethyl-salicylic aldehyde, 5-ethyl-salicylic aldehyde, 4-ethyl-salicylic aldehyde, 3,5-dimethyl-salicylic aldehyde, 4,5-dimethyl-salicylic aldehyde, 3-phenyl-salicylic aldehyde, 5-phenyl-salicylic aldehyde, 5-fluoro-2-hydroxyacetophenone, 4-methoxy-2-hydroxy-acetophenone, 5-methoxy-2-hydroxy-acetophenone, 3-chloro-2-hydroxy-acetophenone, 5-chloro-2-hydroxy-acetophenone, 3,5-dichloro-2-hydroxy-acetophenone, 5-bromo-2-hydroxy-acetophenone, 3,5-dibromo-2-hydroxy-acetophenone, 3-methyl-2-hydroxy-acetophenone, 5-chloro-3-methyl-2-hydroxy-acetophenone, 5-methyl-2-hydroxy-acetophenone, 3-chloro-5-methyl-2-hydroxy-acetophenone, 3-bromo-5-methyl-2-hydroxy-acetophenone, 4-methyl-2-hydroxy-acetophenone, 5-methoxy-2-hydroxy-acetophenone, 5-ethoxy-2-hydroxy-acetophenone, 5-fluoro-2-hydroxy-propiophenone, 5-chloro-2-hydroxy-propiophenone, 3,5-dichloro-2-hydroxy-propiophenone, 5-bromo-2-hydroxy-propiophenone, 3,5-dibromo-2-hydroxy-propiophenone, 3,5-dichloro-2-hydroxy-benzophenone, 3,5-dibromo-2-hydroxy-benzophenone, 5-methyl-2-hydroxy-benzophenone, 3-bromo-5-methyl-2-hydroxy-benzophenone, 2,4,6-trimethyl-2-hydroxy-benzophenone, 2',5,6-trimethyl-2-hydroxy-benzophenone, 2-hydroxy-1-naphthaldehyde, 4-chloro-2-hydroxy-1-naphthaldehyde, 1-hydroxy-2-naphthaldehyde, 3-hydroxy-2-naphthaldehyde and methyl-(2-hydroxy-naphthyl)-(1)-ketone.

As compounds of the general formulae (6), (6') and (7) there may be mentioned, for example, the following substances: benzylchloride, p-cyano-benzylchloride, p-carbomethoxy-benzylchloride, p-nitro-benzylchloride, p-trifluoromethyl-benzylchloride, o-trifluoro-methyl benzylchloride, 2,3,4,5,6-pentafluoro benzylchloride, m-trifluoromethyl benzylchloride, 4-bromomethyl benzosulfonic acid-dimethyl amide, 2-chloromethyl-4-nitrophenol, 4-chloromethyl-α-phenyl-anisol, 5-bromomethyl-3-(4-tolyl)-1,2,4-oxadiazole, cinnamyl chloride, cinnamyl bromide, 1,1-diphenyl-2-bromomethyl-ethylene, 2-bromomethyl-benzofurane, 3-bromomethyl-benzofurane, 2-bromomethyl-thiophene, 4,4'-bis-chloromethyl-diphenyl, 4,4'-bis-chloromethyl-diphenyl ether, 2-bromomethyl-4,5-benzo-benzofurane, 2-chloromethyl-benzoxazole, 2-chloromethyl-4,5-benzo-benzoxazole, 2-chloromethyl-5,6-benzo-benzoxazole, 2-chloromethyl-6,7-benzo-benzoxazole, 2-chloromethyl-5-methyl-benzoxazole, 2-chloromethyl-5,6-dimethyl-benzoxazole, 2-bromomethyl-5-carbomethoxy-furane, 2-bromomethyl-5-cyanofurane, 2-bromomethyl-5-carbomethoxy-thiophene, 2-bromomethyl-5-cyano-thiophene, 2-chloromethyl-pyridine, 3-chloromethyl-pyridine, 4-chloromethyl-pyridine, 2-chloromethyl-quinoline, 1-bromomethyl-4-cyano-naphthalene and 1-bromomethyl-4-carbomethoxy-naphthalene.

If the solvents in which the compounds of the general formulae (2), (2') and (4) have been prepared are suitable for the following ring closure, the compounds of the general formulae (2), (2') and (4) have not to be isolated separately.

The condensation to the compounds of the general formula (1) is either carried out without solvent in an alkali melt or in an organic strongly polar solvent. There may be used, for example, solvents of the general formula (8)

(8) 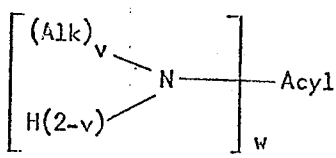

wherein "Alk" is a lower alkyl group having up to 4 carbon atoms, "Acyl" is the radical of a low-molecular carboxylic acid having up to 4 carbon atoms, especially formic acid and acetic acid, or the phosphoric acid radical, $w$ indicates the basicity of the acid and $v$ is zero or the numbers 1 or 2.

The following solvents may, for example, also suitably be used: tetramethyl urea, N-methyl-pyrrolidone, acetonitrile or pyridine.

The solvents, however, which are of the general formula (8) are especially important, among which those are preferred in which $v$ is 2. Dimethyl formamide, hexamethyl-phosphoric acid tris-amide, diethyl-formamide and dimethyl-acetamide are of special interest.

The solvents can be used separately or in admixture with one another.

For the condensation reaction, strongly basic condensation agents are required, which are, for example, the alkali metals or alkaline earth metals, the strongly basic compounds thereof as well as strongly basic aluminium compounds, for example, hydroxides, amides, hydrides, alcoholates, sulfides and strongly basic ion exchangers.

The alcoholates to be used are especially derived from linear-chain, branched-chain or cyclic lower aliphatic alcohols having up to 8 carbon atoms, preferably from 1 to 4 carbon atoms, preferably from alkanols.

The sodium or potassium compounds are preferably used, the hydroxides, amides and alcoholates thereof are of special interest in practice.

When carrying out the condensation in the alkali melt there are used from the condensation agents of the series mentioned above those which melt without possible decomposition. Especially suitable are lithium, sodium and potassium hydroxide. These condensation agents can be used separately or in admixture with one another. The latter form is important for the reduction of the melt temperature when carrying out the condensation in the alkali melt.

The amount of condensation agent to be used varies widely. Although a catalytic amount is sufficient for the condensation reaction in the solvent, the amount is preferably equivalent, but also however, a many times equivalent amount is used especially if the compounds to be condensated contain groups capable of being hydrolized or if higher temperatures are required in which case part of the condensation agent is consumed by reaction with the solvent.

When carrying out the reaction in the melt, it is also advantageous to use a many times equivalent amount of condensation agent.

Preliminary tests, however, allow to evaluate the amount of condensation agent to be added at best.

The reaction temperature, too, varies within wide limits depending on the process employed and on the compounds to be condensated, and may easily be evaluated by preliminary tests. If using solvents it is within the range of −20°C and the boiling point of the corresponding solvent, preferably, however, within the range of from −20°C and 200°C, more preferably of from 0°C to 160°C. When using the process in the melt, its lower limit is determined by the melt temperature of the corresponding eutectic melt, its upper limit by the temperature at which the components are decomposed in the melt. The temperatures are preferably within the range of from 200°C to 400°C.

When the starting compounds to be condensated contain radicals sensitive to hydrolysis, for example, carboxylic acid ester groups, condensation products are isolated, especially at high reaction temperatures, in which these groups are present in hydrolysed state, for example, the free carboxylic acids or the corresponding salts thereof, depending on the method of working up.

The compounds of the general formula (1) which can be prepared by the reaction described above are scintillators and optical brighteners and valuable intermediate products for a variety of syntheses, for example, for the preparation of dyestuffs and pharmaceutical products.

The use of such benzofuranes as optical brighteners is disclosed in U.S. patent applications Ser. Nos. 279,531 and 279,735 of even filing date, the applicants of which are Wilfried Sahm, Erich Schinzel and Günter Rösch and Wilfried Sahm and Günter Rösch, respectively, corresponding to Swiss patent applications Ser. Nos. 11924/71 and 11925/71, the priority of which is claimed therefor and the assignee's docket Nos. of which are HOE 71/F 211 and 212 respectively.

The following Examples illustrate the invention, the parts and percentages being by weight, unless stated otherwise.

EXAMPLE 1

11.5 g of o-formyl-(4-cyano-benzyloxy)-benzene were dissolved in 100 ml of dimethyl-formamide (in the following DMF). 11.2 g of potassium hydroxide (powder, of about 85 percent strength) were added and the mixture was heated to 50°C for 30 minutes. Then, the mixture was introduced in 300 ml of ice water by stirring, the crystallized precipitate was suction-filtered and the whole was dried at 60°C in vacuo. Thus, 9.8 g of crude product of the formula

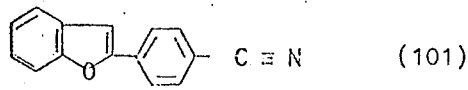 (101)

were obtained having a melting point of from 128° to 137°C.

The substance was purified by recrystallization from gasoline (range of boiling temperature: 100° to 150°C); melting point: 141°–143°C.

The o-formyl-(4-cyano-benzyloxy)-benzene was prepared by boiling equivalent amounts of salicylic aldehyde-sodium for 15 minutes with p-cyano-benzyl-chloride in DMF. The crude product precipitated by water and dried had a melting point of from 98° to 102°C and could be used for the synthesis of the benzofurane mentioned above without further purification.

EXAMPLE 2

17.2 g of 2-naphthol-1-aldehyde were dissolved in 150 ml of DMF. Then, 6.0 g of sodium ethylate and 14.1 g of p-cyanobenzyl chloride were introduced in the solution. The solution was boiled under reflux for 30 minutes. After cooling the reaction solution was introduced in a mixture of 250 ml of ice water and 250 ml of methanol. The precipitated product was suction-filtered, dried and recrystallized from 300 ml of n-butanol with adding active charcoal. 24.6 g of the compound of the formula (102)

(102) 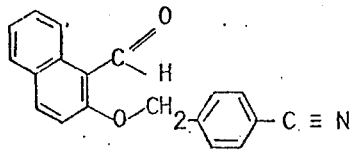

having a melting point of from 162°–163.5°C were so obtained. 14.35 g of this compound (102) were dissolved in 150 ml of DMF. Then, 8.4 g of potassium hydroxide in pulverized form (of about 90 percent strength) were added. The suspension was stirred for 1 hour at room temperature. Then, it was poured onto 1.5 l of ice water, the pH was adjusted to 5–7 with hydrochloric acid and the precipitate which was so formed was suction-filtered. It was washed with water and dried at 60°C in vacuo. 13.2 g of crude product having a melting point of from 167°–168°C were so obtained and it was redissolved from 200 ml of n-butanol with adding active charcoal. 9.5 g of very pure 2-(p-cyano-phenyl)-naphthofurane of the formula (103) 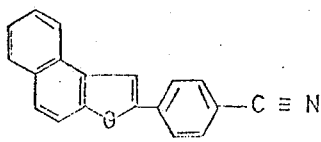

precipitated as yellowish crystals having a melting point of from 173°–175°C.

Similarly good yields of compound (103) were obtained by intramolecular condensation of compound (102) in the solvents listed in the following Table and at a temperature of 30°C indicated herein in the presence of potassium hydroxide:

| No. | Solvent | Yield |
|---|---|---|
| 2a | pyridine | 9.2 g |
| 2b | acetonitrile | 9.4 g |
| 2c | N-methyl-pyrrolidone | 7.9 g |
| 2d | hexamethyl-phosphoric acid tris amide | 9.6 g |
| 2e | N,N'-dimethyl-acetamide | 9.6 g |

In an analogous manner, the compound of the following formula was obtained:

(142) 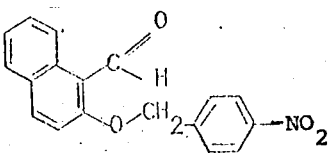

Melting point: 183°–184°C. This compound was condensated in DMF in the presence of potassium hydroxide to yield 2-(p-nitro-phenyl)-naphthofurane of the formula

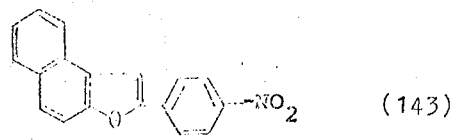 (143)

having a melting point of from 218° to 220°C.

EXAMPLE 3

17.2 g of 2-naphthol-1-aldehyde were heated to the boiling temperature for 30 minutes with 15.2 g of cinnamyl chloride and 6.5 g of sodium ethylate in 150 ml of DMF. The mixture was cooled and then introduced in a mixture of 250 ml of methanol and 250 ml of ice water, the precipitate which had formed was suction-filtered and it was recrystallized after drying from 250 ml of n-butanol. 18 g of colourless crystals of a product of the following formula were so obtained.

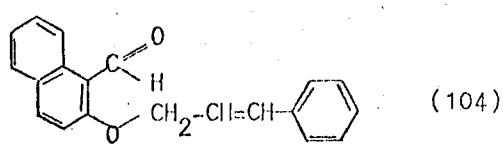 (104)

Melting point: 137.5°–138.5°C.

14.4 g of the compound (104) were stirred with 8.4 g of potassium hydroxide in pulverized form (of about 85 percent strength) in 150 ml of DMF at 60°C for 2 hours. After cooling the mixture was worked up in the same manner as described in Example 2. The crude product was recrystallized from 400 ml of n-butanol with adding active charcoal. 8.7 g of a slightly yellow crystalline substance of the formula

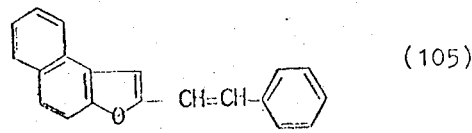 (105)

were so obtained. Melting point: 174°–176°C.

EXAMPLE 4

58 g of salicylic aldehyde-sodium were heated to the boil for 60 minutes with 50.0 g of 4,4'-bis-chloromethyl-diphenyl in 900 ml of DMF. After having worked up in the same manner as described in the above Examples, 83.8 g of crystalline crude product of the following formula were obtained:

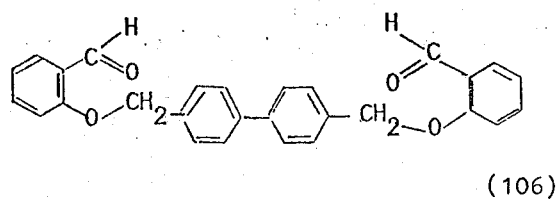

(106)

Melting point: 193°–195°C. 21.1 g of the compound 106 were heated to the boil for 6 hours under nitrogen in 250 ml of DMF with 22.4 g of potassium-tertiary butylate. The mixture was then cooled, the precipitate which had thus formed was suction-filtered, the whole was washed with methanol and dried at 60°C under vacuum. 9.2 g of crude product of the formula (107) 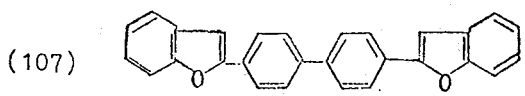

were so obtained. The crude product was recrystallized from 500 ml of benzoic acid methyl ester with adding active charcoal. The purified yellow, crystallized product had a melting point above 300°C.

| $C_{28}H_{18}O_2$(386.45): | Calculated: | C, 87.9; | H, 4.79. |
|---|---|---|---|
| | Found: | C, 87.5; | H, 4.80. |

λ max. (absorption/DMF) = 351 nm; ε = 7.06 . 10⁴

When carrying out the condensation reaction in an analogous manner as for the preparation of compound (106) and starting from the compounds (144), (145), (146), (147) and (148)

boiling DMF with yields of about 59 percent of the theory.

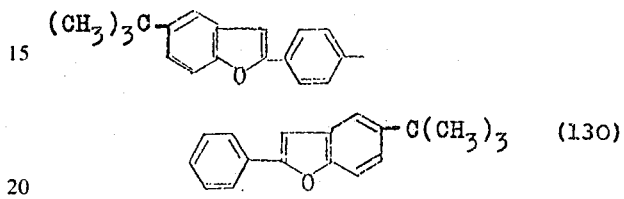

Melting point: 241°C
$C_{30}H_{22}O_2$ (414.51): Calculated: C, 86.7; H 5.34.
Found: C, 86.8; H, 5.4.

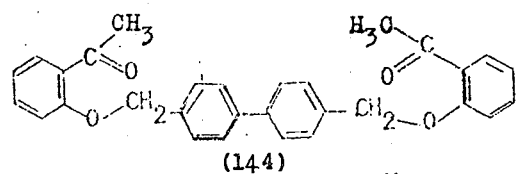

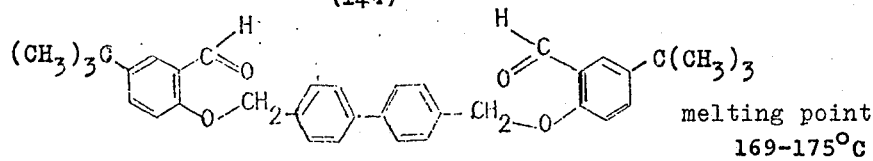

(144)

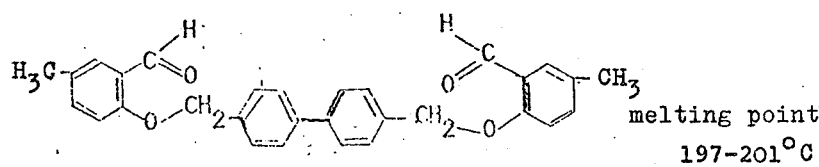

(145)

melting point 169-175°C

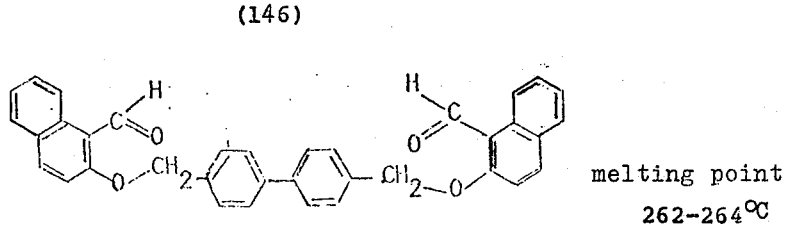

(146)

melting point 197-201°C

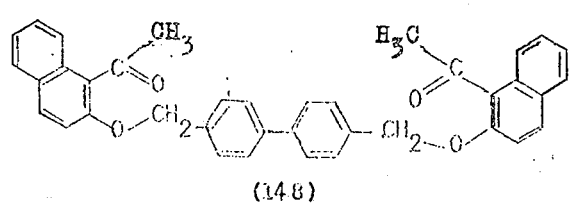

(147)

melting point 262-264°C (148)

the following compounds (129), (130), (131), (132) and, correspondingly, the compound (133), can be prepared, the condensation having been carried out in Melting point: > 350°C
$C_{36}H_{34}O_2$ (498.67): Calculated: C, 86.6; H, 6.88.
Found: C, 86.4; H, 6.6.

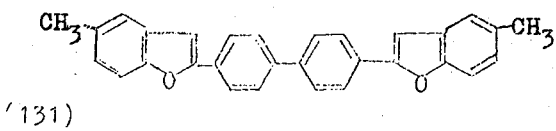

(131)

Melting point: > 350°C
C₃₀H₂₂O₂ (414.51): Calculated: C, 86.7; H, 5.34.
Found: C, 86.8; H, 5.2.

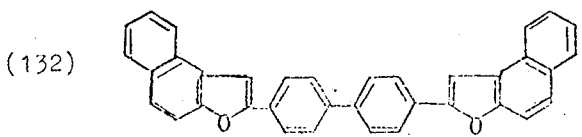

(132)

Melting point: > 350°C

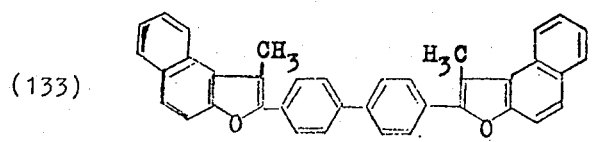

(133)

Melting point: 289°–290°C

In an analogous manner the compounds of the formulae (134) to (137) may also be prepared from the corresponding starting compounds:

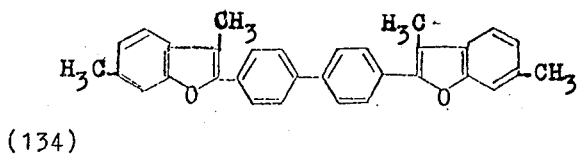

(134)

Melting point: 250°–251°C

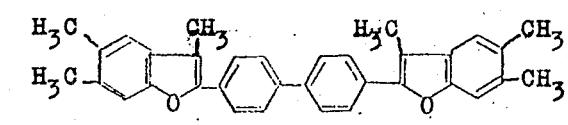

(135)

Melting point: 270°–272°C

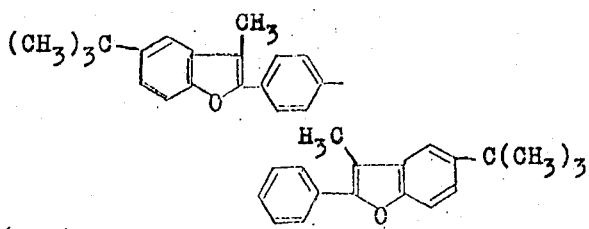

(136)

Melting point: 299°–301°C

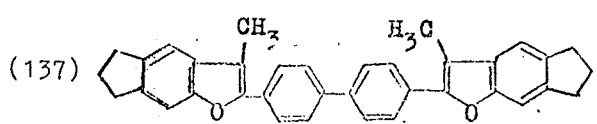

(137)

Melting point: 265°–268°C

EXAMPLE 5

3.36 g of potassium hydroxide (powder, of about 90 percent strength) were added at room temperature to 9.6 g of 1-formyl-2-(4-carbomethoxy-benzyloxy)-naphthalene (melting point: 163°–165°C), prepared in an analogous manner as described in Example 2 from salicylic aldehyde-sodium with p-carbomethoxy-benzyl chloride, in 100 ml of DMF. The solution was then stirred at 70°C for 60 minutes, cooled with ice and then introduced in 300 ml of ice-cold 1 N HCl. After 15 minutes, the precipitate was suction-filtered, washed with water until the filtrate was free from chlorine ions, and dried at 60°C in vacuo. 8.8 g of crude product of the following formula were obtained:

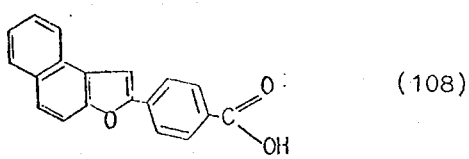

(108)

It was in the form of a whitish yellow powder having a melting point of from 283°–287°C. The carboxylic acid was recrystallized from trichlorobenzene. The mother-of-pearl-coloured leaflets had a melting point of 303°C

EXAMPLE 6

4.9 g of 1-bromomethyl-4-cyano-naphthalene were heated to the boil for 15 minutes with 2.9 g of salicylic aldehyde-sodium in 50 ml of DMF. Then, the solution was cooled in the ice bath and 1.4 g of potassium hydroxide (powder, of about 80 percent strength) were added at 10°C. The mixture was stirred at room temperature for 60 minutes, it was then poured onto a mixture of 100 ml of ice water and 50 ml of methanol, it was adjusted with 2 N HCl until it became neutral, the precipitate was suction-filtered and washed with water. After drying in vacuo at 50°C, 5.1 g of crude product of the formula

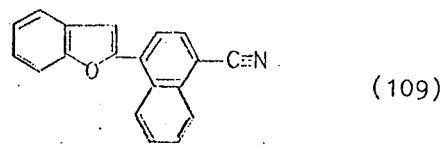

(109)

were obtained which had a melting point of from 126° to 128°C. This product was recrystallized from 50 ml of n-butanol with adding active charcoal. 4.2 g of pure product were so obtained. Melting point: 127°–128°C In an analogous manner, the compounds 138 and 139 were prepared:

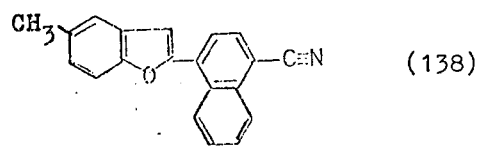

(138)

Melting point: 195°C

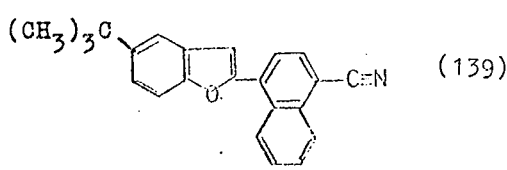

(139)

Melting point: 140°C

EXAMPLE 7

27.9 g of 1-bromomethyl-4-carbomethoxynaphthalene were heated to 130°C for 30 minutes with salicylic aldehyde-sodium in 150 ml of dimethylacetamide. Then, the mixture was cooled in the ice-bath and 12 g of NaOH (pulverized, of about 90 percent strength) were added at 20°C. The reaction was allowed to continue for 1 hour at 70°C. The mixture was then poured onto 500 ml of ice water, the product was precipitated with 2 N HCl, suction-filtered, washed with water until the filtrate was free from chlorine ions and dried at 60°C in vacuo. 25.6 g of carboxylic acid of the formula (110) 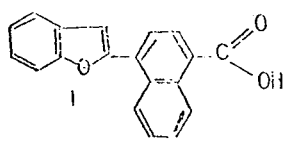

were so obtained. Melting point: 210°–220°C. The product was recrystallized from 150 ml of nitrobenzene. Yield: 21.7 g, melting point: 222°–223°C.

The compound (110) may also be prepared in an analogous manner as described in Example 5 in a two-stages operation by intermediate isolation of compound (111). Melting point: 139°–140°C.

(111) 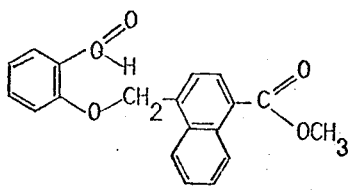

EXAMPLE 8

15 g of the compound (106) were stirred in a porcelaine pot for 30 minutes in a melt of 20 g of KOH and 20 g of NaOH. The mixture was then cooled, the melt was taken up in 500 ml of water and concentrated hydrochloric acid was added until the mixture became neutral. The precipitate was suction-filtered and the crude product was treated in the same manner as described in Example 4. 4.8 g of the compound (107) were so obtained which had the properties described in Example 4.

EXAMPLE 9

21.1 go of 2-bromomethyl benzofurane were heated to the boil for 45 minutes with 14.8 g of salicylic aldehyde-sodium in DMF. The mixture was then cooled and isolated in an analogous manner as described in Example 2. The yield was 22.5 g of the compound of formula (112) 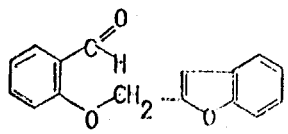

Melting point: 62°–63°C 20 g of the compound (112) were treated for 30 minutes in 100 ml of boiling DMF with 8 g of potassium-tert.-butylate. When cooling, the compound of the formula

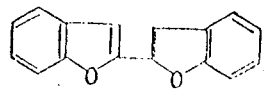 (113)

was crystallized in the form of slightly yellow small needles. It was suction-filtered, washed with ethanol and dried in vacuo. Yield: 15.3 g; melting point: 197°–198°C Compound (113) can also be obtained using an alkali melt (KOH/NaOH=1:1) of compound (112) if carrying out the process as described in Example 8.

EXAMPLE 10

When using instead of salicylic aldehyde-sodium the sodium salt of 2-naphthol-1-aldehyde and proceeding in the same manner as described in Example 9 while using 2-bromomethyl benzofurane and isolating intermediately the compound of formula

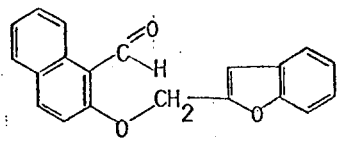 (114)

(melting point: 141°–142°C), the compound of formula

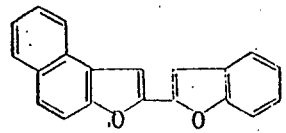 (115)

was obtained having a melting point of 171°C.

In an analogous manner, the compound of the formula

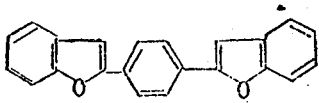 (140)

was obtained, melting point: 306°–308°C, by condensation of the compound of formula

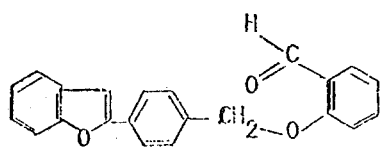 (141)

Melting point: 108°–110°C.

In an analogous manner, the condensation of compound

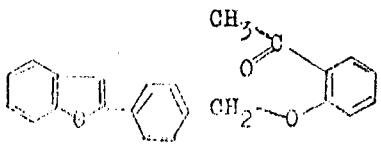 (150)

leads to the compound of the formula (151) 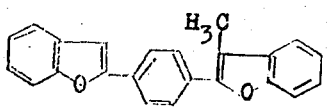

having a melting point of 145°C. The compound of formula 152

(152) 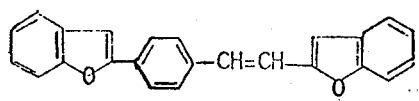

having a melting point of 290°C may also be synthesized by condensation of the compound of formula 153.

(153) 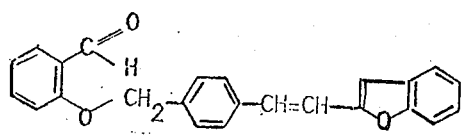

EXAMPLE 11

When treating 13.6 g of 2-hydroxy-acetophenone, 6 g of sodium methylate, 14.1 g of p-cyano-benzylchloride, 15 g of potassium-tert.-butylate and 250 ml of DMF in an analogous manner as described in Example 6, 18.9 g of crude product of the formula (116) 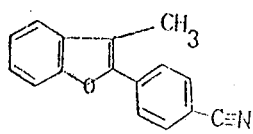

were obtained. Melting point: 130°–132°C. The substance was recrystallized from 150 ml of n-butanol with adding active charcoal. 13.4 g of pure product were so obtained. Melting point: 140°–142°C.

EXAMPLE 12

When using the following chloromethyl compounds:

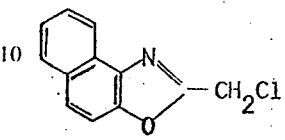  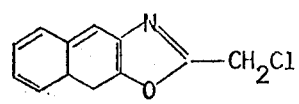
(117)  (118)

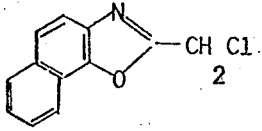  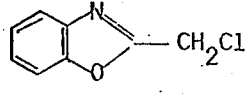
(119)  (120)

and

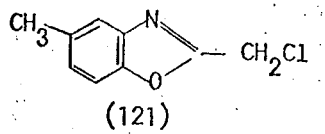
(121)

as well as salicylic aldehyde-sodium or the sodium salt of 2-hydroxy-4-methoxy-benzaldehyde or the sodium salt of 1-formyl-2-hydroxy-naphthalene the following compounds can be obtained in an analogous manner as described in Examples 9 and 10:

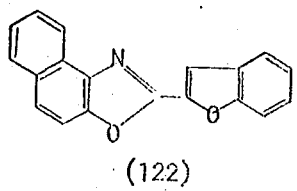
(122)

Melting point: 204°C

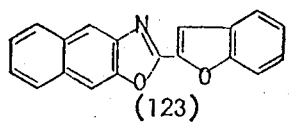
(123)

Melting point: 298°C

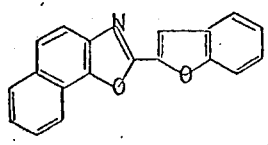
(124)

Melting point: 171 – 172.5°C

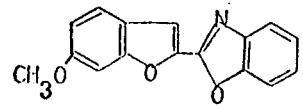
(125)

Melting point: 144 – 145.5°C

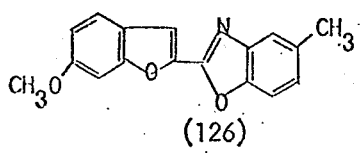
(126)

Melting point: 127 – 128°C

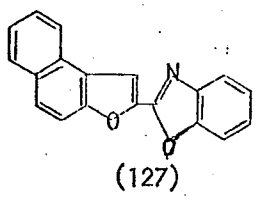
(127)

Melting point: 170 – 172°C

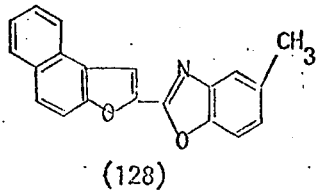
(128)

Melting point: 193.5 – 194.5°C

We claim:
1. A process for the preparation of a compound of the formula

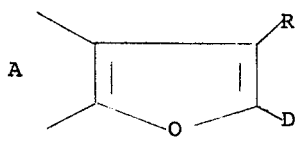

in which A is a benzene or naphthalene nucleus two adjacent carbon atoms of which are condensed with the furane nucleus in the manner indicated, R is hydrogen, lower alkyl or phenyl and D is phenyl, naphthyl, styryl, benzoxazolyl, naphthoxazolyl, benzofuranyl, naphthofuranyl or phenyl, biphenylyl or styryl substituted by benzofuranyl or naphthofuranyl, which substituents D and A are unsubstituted or substituted by lower alkyl, lower alkoxy, lower alkenyl, lower alkylene, carboxy, lower carboalkoxy, carboxylic acid amide, carboxylic acid mono- and di-(lower alkyl) amide, carboxylic acid piperidide or morpholide, cyano, sulfo, sulfonic acid lower alkyl ester, sulfonic acid amide or mono- or di-(lower alkyl) amide, or halogen, which process comprises splitting off water from an ether of the formula

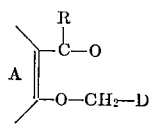

in which A, R and D are as defined above by reacting said ether at a temperature of about −20° to about 200°C. with a strongly alkaline condensating agent selected from the group consisting of an alkali metal hydroxide, an alkaline earth metal hydroxide, an alkali metal sulfide, an alkaline earth metal sulfide, an alkali metal amide, an alkaline earth metal amide, aluminum amide, an alkali metal hydride, an alkaline earth metal hydride, aluminum hydride, an alkali metal alcoholate, an alkaline earth metal alcoholate, an aluminum alcoholate and a strongly basic ion exchanger in a solvent selected from the group consisting of those of the formulae

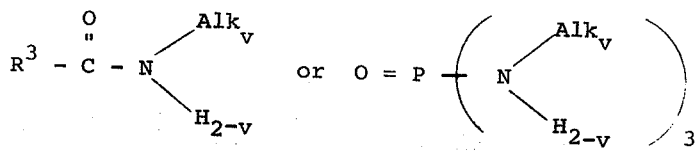

wherein Alk is lower alkyl having up to 4 carbon atoms, wherein $R^3$ is H or alkyl having 1 to 3 carbon atoms and wherein $v$ is zero or the numbers 1 or 2, tetramethyl urea, N-methyl-2-pyrrolidone, acetonitril, pyridine and a mixture of said solvents.

2. A process as claimed in claim 1, wherein A is an annellated benzene or naphthalene nucleus which is unsubstituted or substituted once or twice by lower alkyl, lower alkoxy or lower alkylene, R is hydrogen or lower alkyl and D is phenyl, carboxyphenyl, cyanophenyl, naphthyl, cyanonaphthyl, styryl, a group of the formula

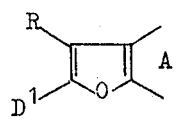

in which A and R are as defined above and $D^1$ is a direct bond, phenylene, biphenylene or styrylene, or a group of the formula

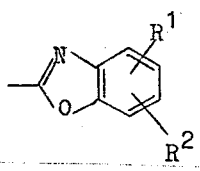

in which $R^1$ and $R^2$ each is hydrogen, lower alkyl, lower alkoxy, or together lower alkylene or an annellated benzene nucleus.

3. A process as claimed in claim 1, wherein the reaction is performed in a solvent selected from the group consisting of dimethyl formamide, diethyl formamide, dimethyl acetamide, hexamethyl phosphoric acid trisamide and a mixture thereof.

4. A process as claimed in claim 1, wherein the condensating agent is sodium or potassium hydroxide, amide, lower alkanolate or a strongly basic ion exchanger.

5. A process as claimed in claim 1, wherein the condensation agent is used in excess.

* * * * *